Figure 5:
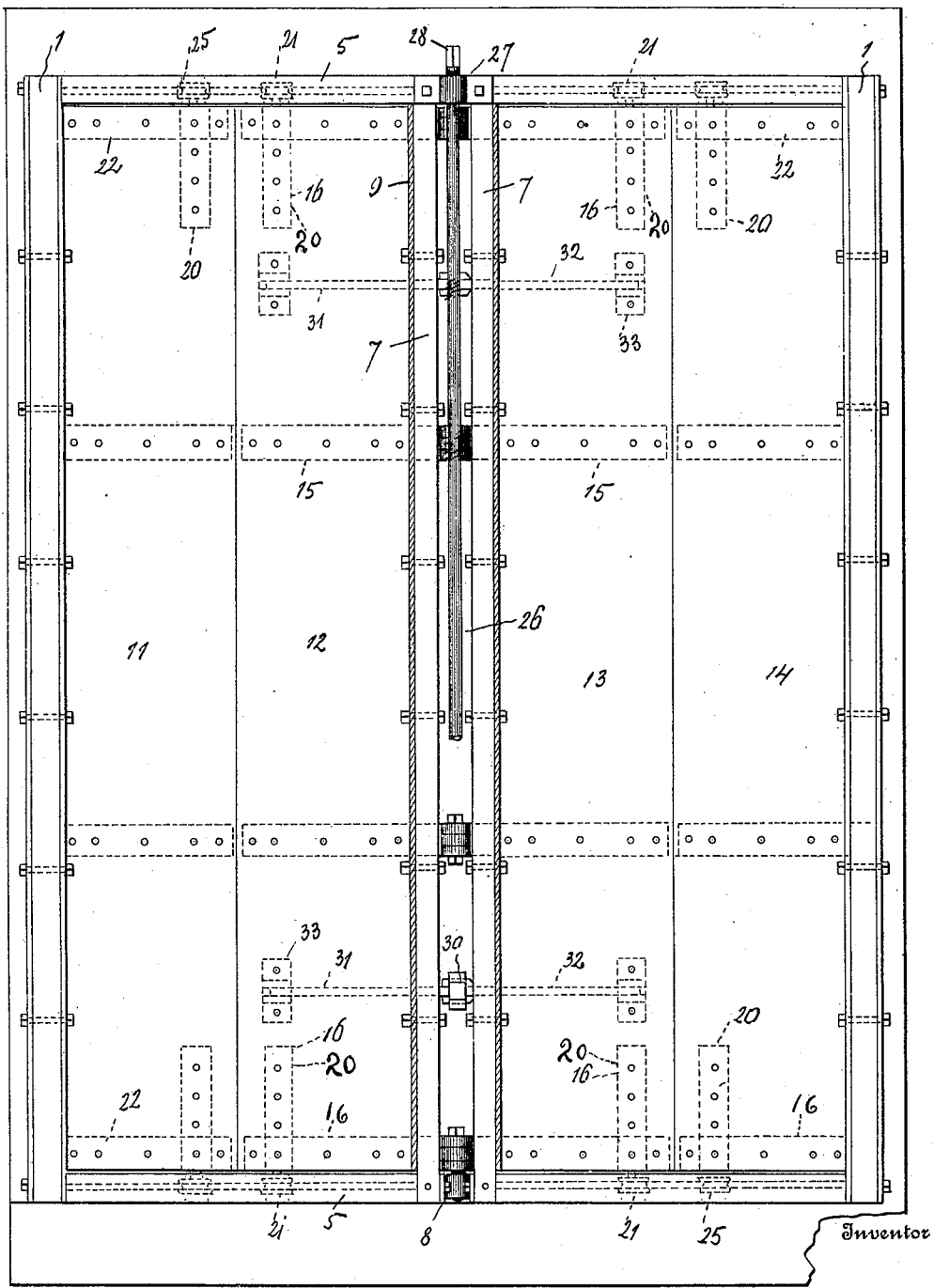

P. J. HARRIGAN.
DOOR OPERATING MECHANISM.
APPLICATION FILED DEC. 14, 1908.
975,860.
Patented Nov. 15, 1910.
7 SHEETS—SHEET 1.
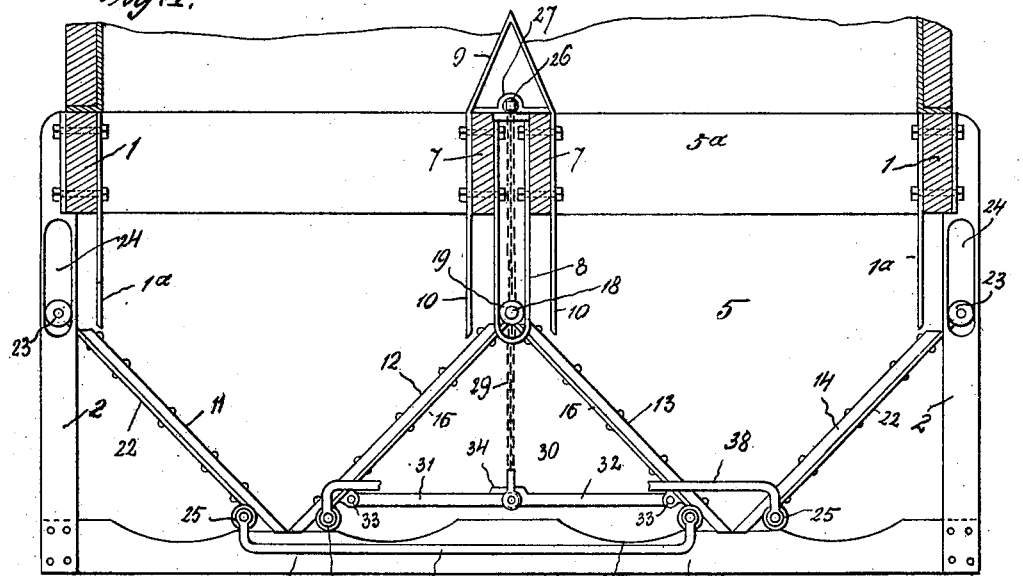
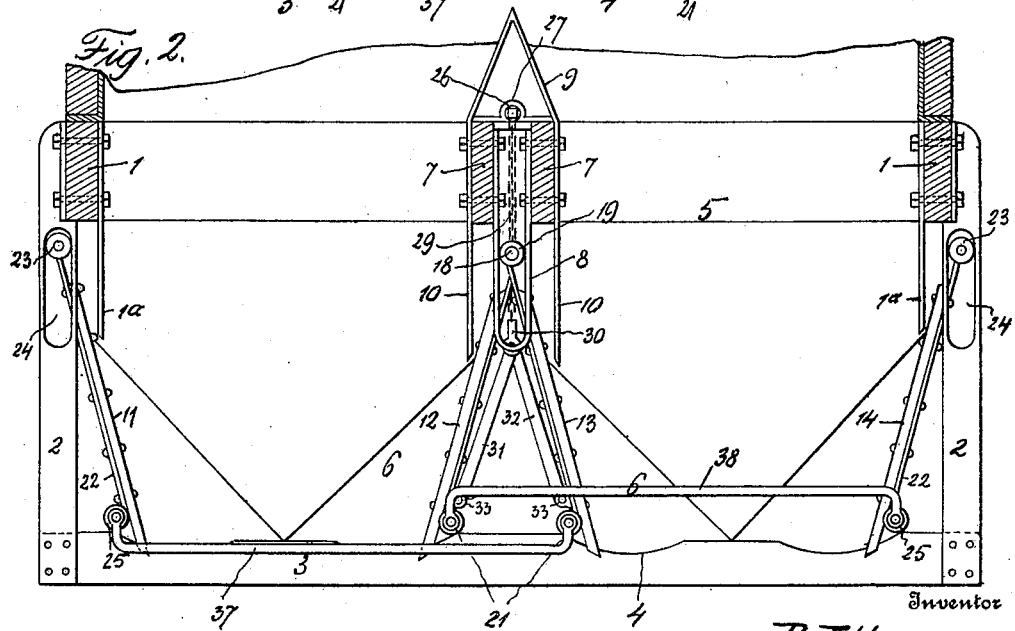

P. J. HARRIGAN.
DOOR OPERATING MECHANISM.
APPLICATION FILED DEC. 14, 1908.
975,860.
Patented Nov. 15, 1910.
7 SHEETS—SHEET 2.
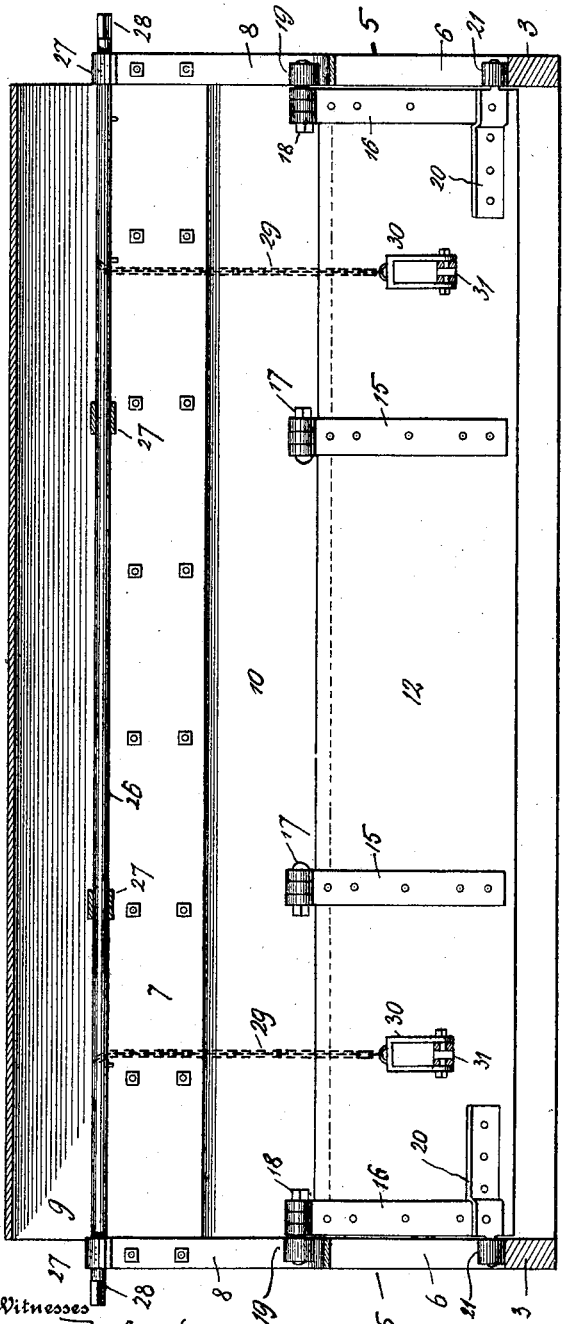
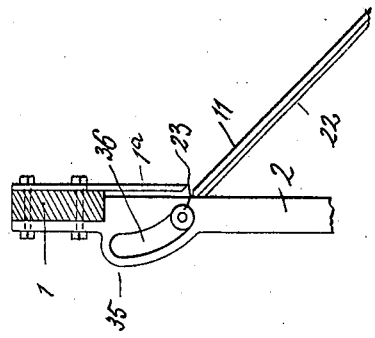
Witnesses
A. H. Rahsag,
N. H. Butler
Inventor
P. J. Harrigan,
By H. C. Everid
Attorneys

P. J. HARRIGAN.
DOOR OPERATING MECHANISM.
APPLICATION FILED DEC. 14, 1908.

975,860.

Patented Nov. 15, 1910.
7 SHEETS—SHEET 4.

Witnesses
A. H. Rabsag,
O. H. Butler

Inventor
P. J. HARRIGAN
By H. C. Everitt
Attorneys

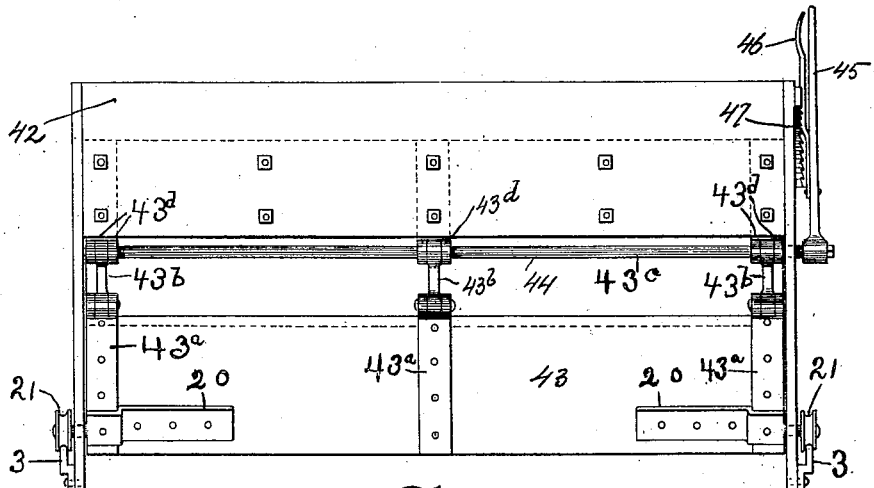
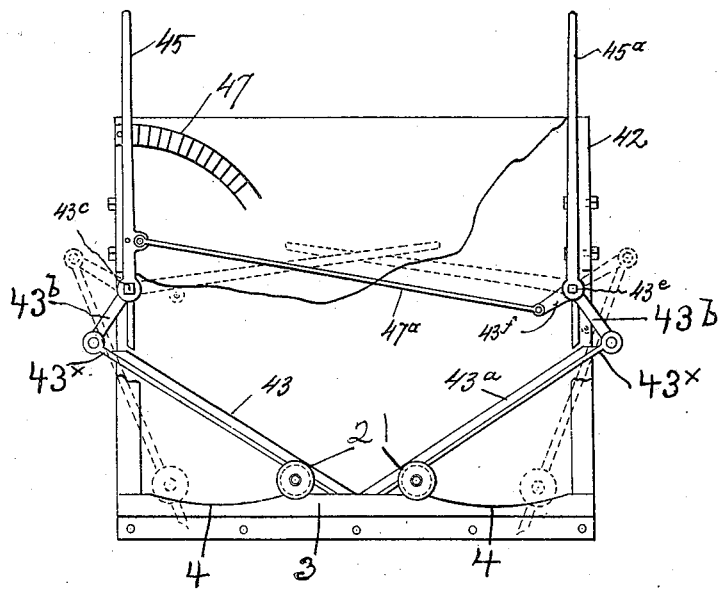

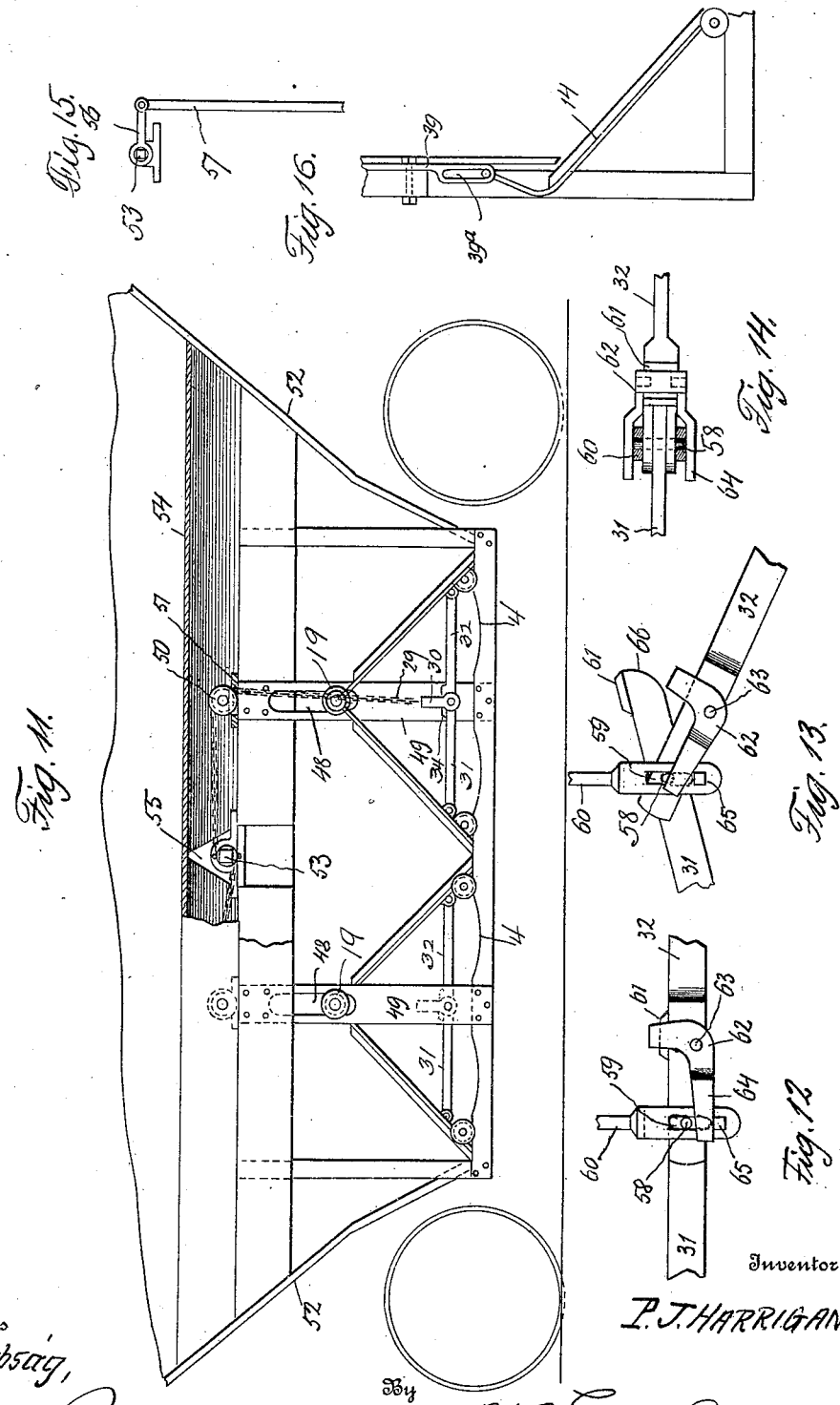

UNITED STATES PATENT OFFICE.

PATRICK J. HARRIGAN, OF McKEESPORT, PENNSYLVANIA.

DOOR-OPERATING MECHANISM.

975,860.  Specification of Letters Patent.  Patented Nov. 15, 1910.

Application filed December 14, 1908. Serial No. 467,433.

*To all whom it may concern:*

Be it known that I, PATRICK J. HARRIGAN, a citizen of the United States of America, residing at McKeesport, in the county of Allegheny and State of Pennsylvania, have invented certain new and useful Improvements in Door-Operating Mechanisms, of which the following is a specification, reference being had therein to the accompanying drawing.

This invention relates to doors and operating mechanism therefor, for cars, wagons, and other vehicles, used for the transportation of materials in bulk, such as coal, grain, coke, ore, and other like material which can be discharged from the car or other vehicle by dumping.

The invention is particularly designed for use in connection with dump cars, and the object of the invention is to provide self-closing doors having an automatic action that will facilitate an entire or partial discharge of the contents of a car, said doors being arranged to automatically close the discharge openings or chutes of the car after the contents have been discharged from such car.

Another object of my invention is to provide a car with movable doors arranged to close by gravity, and to open, when the door securing means is released and after initial opening movement is imparted to the doors, by the weight of the load contained within the car.

A further object of the invention is to provide a dump car with angularly-disposed doors preferably so arranged that when the doors are in the closed position, the load of the car will be directed against the doors in such manner as to maintain the doors in closed position regardless of any means for mechanically-locking the doors in such closed position, the angle of the doors however being such that they may be easily forced to partly open position to render the angle thereof more acute and thereby shift them to such position that the weight of the load is thereby directed against the doors to effect the complete opening of the same.

A further object of my invention is to provide a dump car with movable doors with a novel mechanism for actuating said doors that will prevent the contents of the car from "arching" or binding in the car.

A still further object of my invention is the provision of novel means in connection with a door-operating mechanism, for preventing frozen and settled material from interfering with the operating mechanism employed for opening the doors.

A still further object of my invention is to provide a toggle or hinge-roller bearing-mechanism for manipulating the doors, and a novel lock for preventing the doors of the car from accidentally opening, due to the vibrations of the car when in motion.

A still further object of my invention is to provide a toggle-lock of a novel construction for use in connection with dump car doors, which will positively prevent the toggle levers from moving below the normal level or center, such lock being applicable to the ordinary and well known type of dumping car now being used.

A still further object of this invention is to provide a door-operating mechanism that will be positive in its action, so arranged as to be comparatively free from injury by ordinary use, and highly efficient for opening and closing the doors of dump cars or other like vehicles.

With the above and other objects in view which will appear as the invention is more fully described in detail, the invention consists in the novel construction, combination and arrangement of parts, to be hereinafter specifically described and then set forth in the claims.

Figure 6:
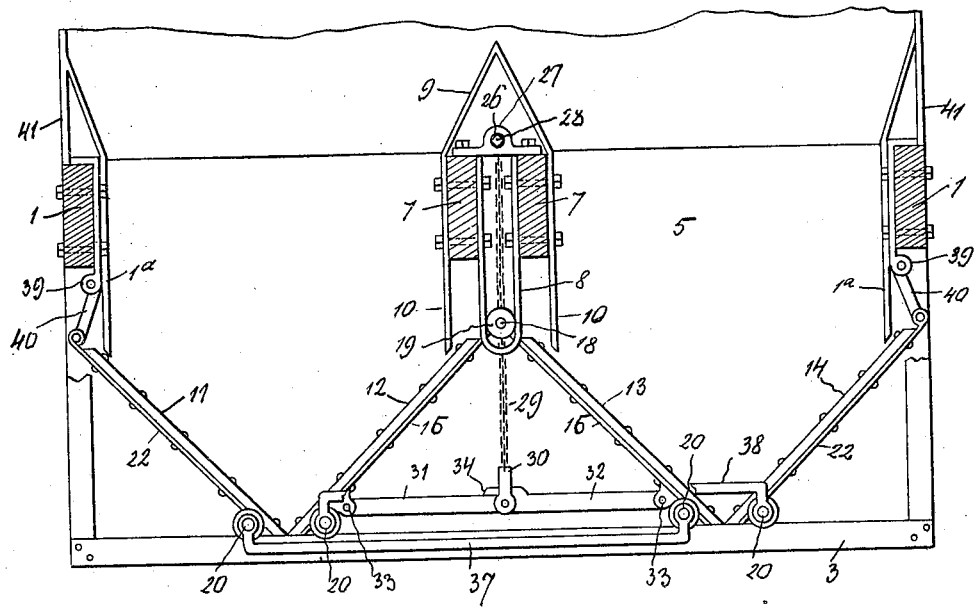
Figure 7:
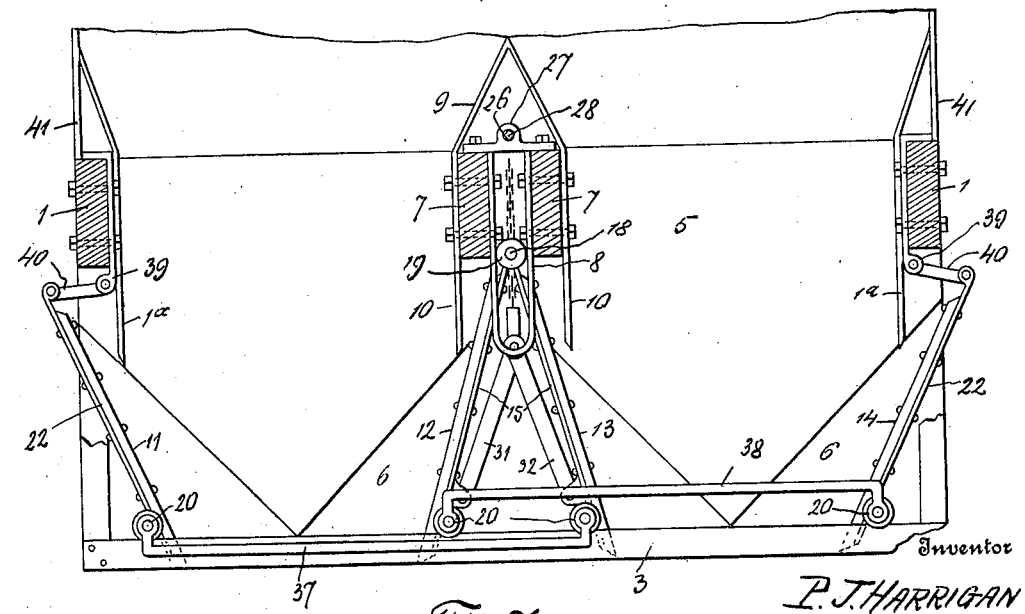
Figure 8:
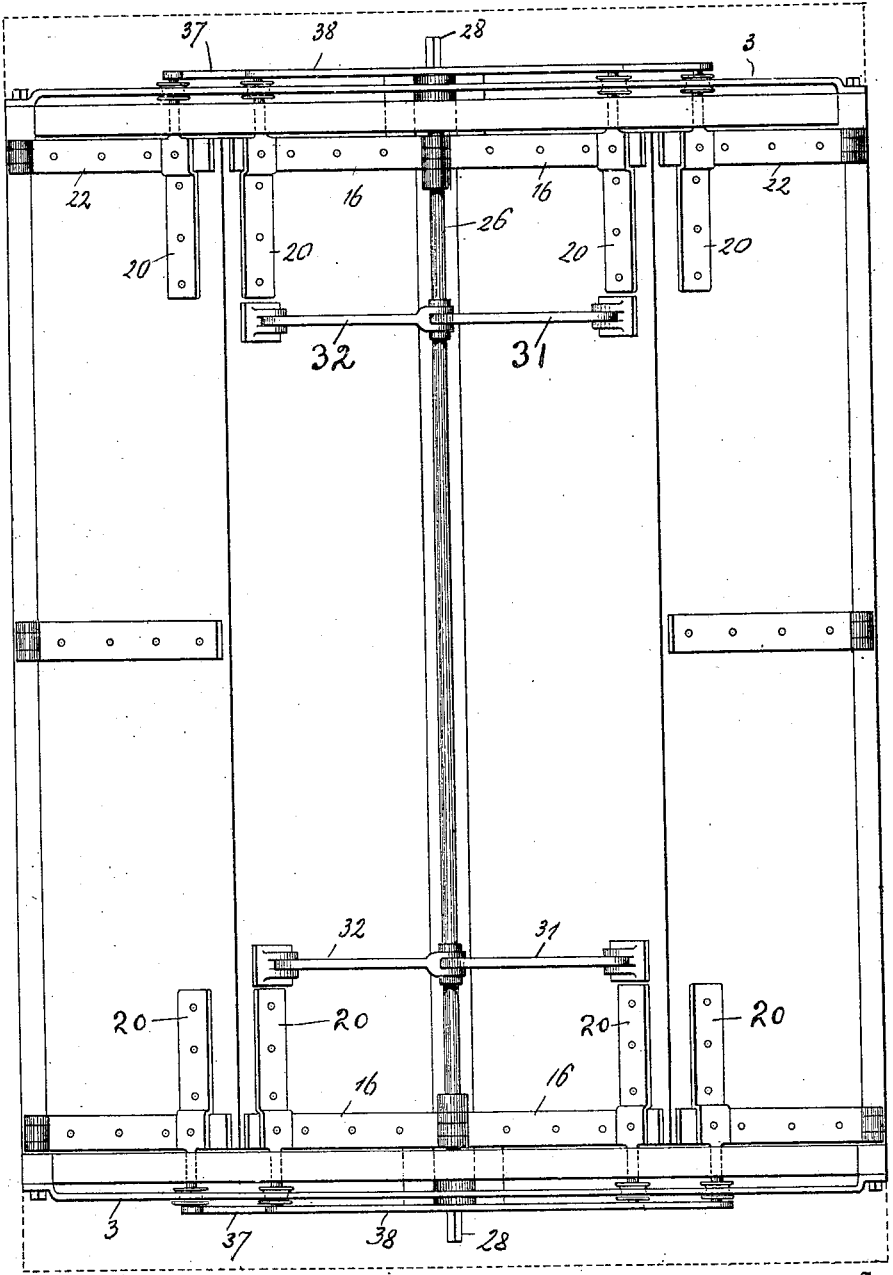

In the drawings, Figure 1 is an end view of the suspension frame of a hopper bottom car with the end plate thereof removed, showing laterally movable doors in the closed position, and the operating mechanism therefor, Fig. 2 is a similar view with the doors in an open position, Fig. 3 is a longitudinal sectional view of a suspension frame of a car, Fig. 4 is an elevation of a portion of the side of the frame, showing a modification of the invention, wherein a shiftable hinge connection is employed, Fig. 5 is a top plan of the suspension frame, partly in horizontal section, Fig. 6 is an end view of the suspension frame, with the end plate thereof removed, illustrating a link-hinge, with the doors in a closed position, Fig. 7 is a similar view with the doors in an open position, Fig. 8 is a bottom plan view of the same, Fig. 9 is a side elevation of a car or wagon body having the doors and operating mechanism therefor constructed in accordance with my invention, Fig. 10 is an end view of the same, partly broken away to better show the doors and operating mechanism, Fig. 11 is an elevation of a suspension frame partly broken away and partly in section, illustrating movable transversely-arranged doors, Fig. 12 is a detail view in elevation of a toggle lock for the door-operating mechanism, the lock being illustrated in this view in a closed position, Fig. 13 is a similar view illustrating a lock in the open position, Fig. 14 is a plan view of the lock, Fig. 15 is a detail view in elevation of a modification of a part of the door-operating mechanism, illustrating a rigid connection in lieu of a cable or chain, and Fig. 16 is a detail view in elevation of a modified form of hinge.

In connection with hopper cars, it is very desirable in the use thereof to provide as large a cubical capacity as may be possible without unnecessarily increasing the height, width, and length of the car. As a consequence, the hopper bottom should be brought as low as possible. However, a difficulty is encountered in this connection with the use of swinging doors, in that the lower edges of the doors swing on the arc of a circle, and are therefore very liable to come in contact with the track in event the hopper is placed low down with respect to the track. This has heretofore made it necessary when swinging doors are used to place the hopper higher with respect to the track than would otherwise be required.

It has been attempted to overcome the objection to placing the doors higher up, by the use of doors swinging on links and located close to the track, thereby increasing the cubical capacity of the car. The difficulty with the use of such doors however is, that the doors must be moved in a horizontal plane along the lading upon suitable guides, and during the winter season, the doors are liable to freeze fast to the lading and guides and cannot be quickly opened. The difficulty of freezing noted above, however, is obviated by using pivotally-swinging or hinged doors having supports shielded from the material contained within the car, so that it will be impossible for the action of the weather to affect the opening and closing of the doors. My invention aims to use such swinging doors and to so arrange the doors and the operating mechanism therefor that the hoppers can be placed comparatively low with respect to the track without sacrificing strength or durability and rigidity in the general construction of the car.

In accordance with my invention, I provide a car with either longitudinally or transversely-arranged shiftable doors having the lower edges thereof supported to move in a horizontal plane when opening or closing. The mechanism for opening and closing the doors is fully protected and shielded from the contents of the car, and is easily and quickly actuated from either side of the car when the doors are to be opened or closed.

Primarily, I desire to call attention to the following important characteristics of my invention which will hereinafter be described. First, the doors are so arranged that their position when open is such, that upon the load being discharged and all weight thereof relieved from the doors, the latter are free to automatically return to closed position, and when the doors are in the closed position, their inclination is such that the weight of the load is directed against the doors in such manner as to tend to maintain the doors in closed position, permitting the use of the doors without mechanical locking means for holding them in closed position if desired; second, shiftable doors having tracks or guides for accelerating the primary movement and retarding the final movement thereof in the opening of the doors as well as accelerating the initial closing movement; third, the employment of novel guides for shifting the lower edges of the doors in a horizontal plane and the upper edges thereof in a plane approximately vertical; fourth, the provision of a car with a movable bottom that can be easily opened without injury to the car or the operator; fifth, the employment of anti-friction bearings for insuring an easy adjustment of the movably-supported edges of the doors; sixth, the tying of all the doors together so that they act in unison, and seventh, the provision of novel automatic locking means for positively locking the doors in closed position.

It is to be understood, that in the preferred form of construction, as well as in the modifications herein shown, all parts that are capable of being made of pressed steel or similar material are so made, and while I do not limit my invention to the use of pressed steel, still I prefer to construct the car doors and the operating mechanism therefor of steel pressed to the necessary shapes whenever it is possible to do so.

Since my invention has reference to that portion of the car commonly styled the body, it is to be understood that various types of under-frames, trucks and brake-rigging can be used, and the doors of the car correctly positioned between the trucks whereby the discharge of the contents of the car will not interfere with the trucks or the brake-rigging.

Referring now to the drawings, with reference to Figs. 1 and 3, 1 designates the longitudinal side sills of the car which ordinarily have the ends thereof connected by bolsters supported upon the trucks and supporting the sides and ends of the car body. These sills 1 between the trucks, are provided with suspension members 2 having the lower ends thereof connected by transverse tracks 3. The tread surfaces of the tracks 3 are provided with spaced depressions or inclinations 4, constituting means for accelerating the initial opening and closing movements of the doors as will more fully appear hereinafter.

The suspension members 2 are connected by end plates 5 having the lower ends thereof cut away as at 6. These end plates together with the members 2 and tracks 3 constitute what I term herein a "suspension frame," and forms a cage directly beneath the bottom opening 5$^a$ of the car body, said opening being intersected by the longitudinal center sills 7 of the car body. The confronting faces of the sills 7 at the ends of the suspension frame, are provided with depending stirrups 8 and upon the sills 7 at the discharge opening 5$^a$ is mounted a longitudinal deflector 9 having depending side plates 10, the deflector 9 forming a housing to protect the shaft of the operating mechanism, and the plates 10 protect the operating mechanism from the contents of the car, and also form a housing or casing which receives the upper edges of one pair of doors. The longitudinal side sills 1 are provided with depending side plates 1$^a$ serving functionally as shields for the upper edges of the doors 11 and 14 to be hereinafter described.

Arranged longitudinally of the suspension frame between the end plates 5, are movable doors 11, 12, 13, and 14 respectively. The doors 11 to 14 form the bottom of the frame, and are arranged to swing open and release the contents of the car. The doors 12 and 13 are provided with strap hinges 15 and 16, the hinges 15 being pivotally-connected together as at 17, while the hinges 16 are pivotally-connected together by pivot pins 18. The strap hinges 16 are at the ends of the doors 12, 13, and the pivot pins 18 are of a greater length than the pivot pins of the strap hinges 15 and project into the stirrups 8 at the ends of the suspension frame. These pivot pins 18 are provided with rollers 19 which slide in the stirrups 8 and permit of the hinge connections of the doors 12 and 13 moving vertically in the suspension frame. The doors 12 and 13 are provided adjacent their lower edges, at the ends thereof, with straps 20 which carry anti-friction rollers 21 that engage and ride upon the tracks 3 of the suspension frame.

The doors 11 and 14 are identical in construction and are provided at the ends thereof with straps 22 carrying anti-friction rollers 23 at their upper ends which engage and ride in vertical slots 24 provided therefor in the members 2. The lower ends of the straps 22 carry anti-friction rollers 25 which rest and ride upon the tracks 3.

The doors 11 to 14 inclusive in a closed position, assume an incline corresponding to the lower cut-away ends of the end plates 5 whereby the suspension frame is practically divided into two longitudinal hoppers having inclined bottoms capable of moving to discharge the contents of the car.

The doors 12 and 14 are connected together near their lower edges by links 38, and the doors 11 and 13 are also connected near their lower edges by links 37 whereby said doors can be moved in unison to open and close at the will of the operator.

The doors 11 to 14 inclusive are adapted to swing open under the action of the contents of the car body after the doors have been initially or primarily moved so as to place the doors at such an angle that the weight of the load against the doors will force them to the full open position, means being provided for imparting the initial or primary movement to the doors, which means will now be described.

The means which I illustrate for actuating the doors of the construction involved in Figs. 1 to 8, is arranged longitudinally of the suspension frame, but as will hereinafter appear in connection with the showing and description of modifications of the invention, can be arranged transversely of the frame or car body.

The door actuating means illustrated in the door shown in Figs. 1 to 8, comprises a winding arbor or shaft 26 journaled in bearings 27 mounted on the central longitudinal sills 7, the ends of said shaft being rectangular or otherwise shaped as at 28, to accommodate a crank or lever (not shown) of that type commonly employed and adapted to be detachably-engaged with either end of the shaft for actuating the same.

Attached to the shaft 27 adjacent to the ends thereof are chains or cables 29 having the lower ends provided with stirrups 30 to which the inner ends of toggle arms 31, 32 are pivotally-connected, said arms being pivotally-connected at their outer ends as at 33, to the underneath faces of the doors 12 and 13. The toggle arms 32 are provided at the inner ends thereof with extensions or overlapping portions 34 serving functionally as locks for the toggle arms, preventing the inner pivoted ends of said arms from lowering below a horizontal plane, or in other words, preventing the toggle from being broken by other than an upward movement of the stirrups 30.

Before describing the operation of the doors 11 to 14 respectively, reference will be had to the various modifications of the invention herein shown.

In Fig. 4 of the drawings I have illustrated one of the suspension members 2 provided with an extension 35 having a segment-shaped slot 36 formed therein, it being understood that each of the members 2 is similarly constructed. These slots receive the anti-friction rollers 23 carried by the upper edges of the doors 11 and 14. This construction is utilized to provide means whereby the upper edges of the doors are moved outwardly and thereby give greater clearance for the discharge of the load, the curvature of the slot facilitating the movement of the door with a less binding effect.

In Figs. 6 to 8 inclusive I have illustrated a construction in which the depressions 4 in the tracks 3 are omitted, which form of track may be desired in connection with certain types of cars. Instead of providing the suspension members 2 with the slots 24 as in the construction shown in Figs. 1 and 2, or with the slots 36 as in the construction shown in Fig. 4, to receive the roller bearings 23, I provide the longitudinal side sills 1 (in this construction, Figs. 6 to 8) with hangers 39 to which the upper edges of the doors 11 and 14 are pivotally-connected by links 40. These links 40 allow the upper edges of the doors 11 and 14 to swing outwardly in the same manner as is permitted by the roller bearings 23 traveling in the slots 36 in the construction shown in Fig. 4. In other respects, the construction shown in these views is the same as that shown in Figs. 1 and 2. The plates 1$^a$ in this construction can be extended to embrace the upper edges of the car body as shown.

In Figs. 9 and 10 of the drawings I have illustrated a pit car or wagon body 42 requiring but a single pair of doors designated 43 and 43$^a$, arranged longitudinally of the body 42 and shiftable in a manner similar to the doors shown in Figs. 6 to 8 inclusive, but operating in connection with tracks having depressions such as shown in Figs. 1 and 2. The door 43 is connected by straps 43$^x$ and links 43$^b$ to a longitudinal rock shaft 43$^c$ supported in hangers 43$^d$ carried by one side of the car body. The door 43$^a$ is similarly connected to a shaft 43$^e$ on the opposite side of the car body, with the exception that one of the links 43$^b$ has an arm 43$^f$, thus making this link substantially bell-crank shaped in form. Mounted upon the ends of the shafts 43$^c$ and 43$^e$ at one end of the car body, are levers 45 and 45$^a$ respectively, one of which, in this instance the lever 45, has a resilient ratchet arm 46 adapted to engage the rack 47 carried by the adjacent end of the car body whereby the levers 45 and 45$^a$ are locked in position to hold the doors closed. The arm 43$^f$ of the bell crank lever is pivotally and detachably connected to the lever 45 by a rod 47$^a$. By disconnecting the rod 47$^a$ the doors 43 and 43$^a$ can be independently operated to discharge the contents of the car body at either side thereof. By connecting the levers together by means of the rod 47$^a$ the doors can be simultaneously operated by the lever 45. This type of door-operating mechanism can be advantageously used in connection with small or narrow-gage cars and wagons, since the independently operated doors permit of the load being discharged at either side of the central line of the car or wagon body.

In Fig. 11 a car body is shown wherein the tracks are arranged longitudinally of the suspension frame with the doors arranged transversely thereof. The tracks are shown in this construction as provided with the depressions 4, though it is obvious that tracks such as are shown in Figs. 6 and 7 may be employed. In the construction shown in this modification the anti-friction rollers 19 travel in vertical slots 48 provided therefor in vertical side frames or suspension members 49. The cables or chains 29 travel over sheaves 50, journaled in beams 51 arranged transversely of the discharge opening of the car body 52. The chains or cables 29 are connected at their upper ends to a transverse shaft or winding arbor 53 supported by the car body. The shaft 53 and sheaves 50 are protected by a longitudinally-extending hood or deflector 54 and a transversely-extending hood or deflector 55. In lieu of using the chains or cables 29, the shaft or winding arbor 53 can be provided with a crank 56 having a pitman 57 (see Fig. 15) connecting with the stirrup 30. In this instance the crank 56 would be made of a sufficient length to allow proper adjustment of the doors.

In Fig. 16 of the drawings a further modification of the invention is shown wherein the hangers 39 such as shown in Figs. 6 and 7 are provided with vertical slots 39$^a$, serving functionally as guides for the upper ends of the straps connected to the outer doors 11 and 14, the links 40 as shown in Figs. 6 and 7 in this instance being dispensed with.

In Figs. 12 to 14 inclusive, I have illustrated a toggle lock that can be advantageously used in connection with the arms 31 and 32. In this construction, the arms 32 are bifurcated at their inner ends to receive the inner ends of the arms 31, said inner ends of the arms 31 being pivotally-mounted in the bifurcation of the arms 32 by pivot pins 58. The ends of the pins 58 protrude into slots 59 formed in a pitman 60 employed for raising the connected ends to the toggles 31 and 32. The end of each toggle 31 is provided with a cross-head 61 adapted to limit the downward movement of the toggle 31, and adapted to engage the cross-head 61 is a yoke 62, which is pivotally-connected as at 63 to the sides of the toggle 32. The yoke 62 is provided with rearward extensions 64 adapted to normally rest on projections 65 carried by the pitman 60 at the lower end thereof.

In operation of the toggle lock above described, the pitman 60 moves in advance of the toggles 31 and 32, the yoke 62 moving with the extensions 64 by reason of the lugs 65 engaging the extensions 64, whereby the yoke 62 will be tilted out of engagement with the cross-head 61 in order that the toggles 31 and 32 may be open, and upon further opening travel or movement of the pitman 60, the same moves the pivot pin 58, and elevates the connected ends of said toggles as shown in Fig. 13. To insure the positive locking of the toggles by the yoke 62, the end of the toggle 31 is beveled as at 66 to permit of the yoke easily riding upwardly over the end of said toggle 31. This lock as heretofore stated can be used in connection with the present type of toggle employed for opening and closing of car doors.

Operation: The shafts 26, 43$^e$, 43$^e$ or 53, as the case may be, are operated to place the different sets of doors in position to be opened by the contents of the car. As the opening action of the doors is the same throughout the different structures shown, reference will be had specifically to Figs. 1 and 2 of the drawings. When the shaft 26 is rotated, the pivoted ends of the toggles 31 and 32 will be elevated and the lower edges of the inner doors 12 and 13 drawn inwardly; at the same time, owing to the links 37 and 38, the lower edges of the doors 11 and 14 will be moved outwardly, the lower edges of all the doors moving approximately in horizontal planes, while the upper edges of all the doors move in vertical planes at right angles to said horizontal planes. The inward movement of the lower edges of the doors 12 and 13 and the outward movement of the lower edges of the doors 11 and 14 is accelerated immediately upon the rollers 21 and 25 reaching the depressions 4 of the tracks 3. These depressions are so shaped as to give the doors sufficient impetus to relieve the shaft 26 of any stresses or strains when rotating the same, thereby rendering the operation of the initial or primary opening of the doors comparatively easy. Immediately upon the rollers 21 reaching the depressions 4, the doors have been shifted so that the contents of the car commence to discharge, and the doors have assumed an angle which causes the weight of the load to be directed against the doors so as to force them to the completely open position and permit of the free discharge of the load.

By providing the plates 10 and 1$^a$, the upper edges of the doors 11 to 14 are fully protected from the contents of the car, and the entire contents of the car may readily discharge, as practically the entire bottom of the car is open as shown in Fig. 2 of the drawings, and no obstructions are offered to the free discharge of the load.

I desire to call attention to the self-closing feature of the door-operating mechanism. It is a well known fact that through the negligence of train men and dumpers the doors of dump cars are often left open. The leaving of the doors open not only necessitates the manual closing thereof, but very often results in the doors being injured and often causes a wreck or derailment of the cars when in motion.

With my improved door-operating mechanism as above described, it is impossible for the doors to remain open unless held open by the operator using a suitable tool for such purpose, as the doors are designed to close by gravity as soon as the load has been discharged, and should they bind in the open position, the vibratory movement of the car when the latter is set in motion is sufficient to loosen them, and the initial closing movement of the doors toward closed position gives them sufficient impetus to cause them to assume the completely closed position. In other words, the doors of the loaded car are automatic in their movement when once started, the weight of the contents of the car opening the doors, and the doors closing by their own weight when the contents of the car is discharged, but, whether open or shut, the doors are approximately the same distance from the track and are absolutely held out of the danger zone relative to the track.

It is obvious that after the load has been discharged from the car, with the doors thereof being relieved of any portion of the weight of the load against them, will, owing to the angle they assume in the completely open position, immediately start to move to closed position, and since their tendency when no weight is against them is to move to closed position, it will be apparent that if they do not gain sufficient impetus in their initial closing movement to cause them to completely close, the jarring of the car when the latter is set in motion will effect and complete the closing of the doors.

It is to be understood that where reference is made herein to the weight of the load holding the doors in closed position, that the doors are disposed at such an angle that the weight of the load thereagainst is tending to hold them closed. This angle however with respect to the sides of the car is such that it does not prevent the partial opening of the doors by the means heretofore described, so as to make the angle of the doors more acute in order that the weight of the load is then directed against the doors to move them to fully opened position. It is obvious therefore that to obtain the desired result, care must be exercised in placing the doors at the proper angle so that they may be manually opened a slight distance in order to shift them to such position that the weight of the load may be directed thereagainst to force them to open position. In practice, I have found that where the doors are placed at an angle of approximately 38 degrees that the weight of the load against the doors tends to hold them in closed position, and at this approximate angle the doors may be readily manually moved by the means described to shift them to a more acute angle, and as the doors are thereby partially opened, the load begins to discharge, and of course then exerts its weight against the doors to move them to completely opened position. Obviously, if the doors are placed at a sufficiently acute angle, say approximately 50 degrees, the weight of the load is then always directed against the doors in such manner as to tend to force them to open position, and makes absolute the necessity for the use of mechanical means to lock the doors in closed position.

Having now described my invention, what I claim as new, is:—

1. The combination with a car body, of a frame suspended beneath said car body, inner and outer doors forming the bottom of said frame, means for movably supporting the bottom edges of said doors, links connecting the lower edges of said inner doors with the lower edges of said outer doors, and means arranged above said doors for moving all of said doors in unison.

2. In a door operating mechanism, the combination of inner and outer doors, means for supporting said doors, said means including suspension members, tracks, stirrups, revoluble rollers carried by said doors and engaging said tracks, members and stirrups, and a shaft for simultaneously moving said doors.

3. In a door operating mechanism, the combination of doors, horizontal tracks movably supporting the lower edges of said doors, means for guiding the upper edges of said doors in a plane at right angles to said tracks, means for coupling the lower edges of said doors whereby said doors will move in unison, and means for operating said doors.

4. In a door operating mechanism, the combination of doors, horizontal tracks movably supporting the lower edges of said doors, means for guiding the upper edges of said doors in a plane at right angles to the tracks, and means for coupling the lower edges of said doors whereby said doors will move in unison.

5. The combination of inner and outer doors controlling the discharge of a car opening, horizontal tracks movably supporting the lower edges of said doors, said tracks having depressions formed therein for accelerating and retarding the movement of said doors, means for simultaneously moving said doors, and means for guiding the upper edges of said doors.

6. The combination of inner and outer doors controlling the discharge of a car opening, horizontal tracks movably supporting the lower edges of said doors, said tracks having depressions formed therein for accelerating and retarding the movement of said doors, and means for simultaneously moving said doors.

7. The combination of inner and outer doors adapted to control the discharge of a car opening, means for causing the lower edges of said doors to move in a horizontal plane, said means including a shaft for actuating said inner doors, links connecting said inner doors to said outer doors, and guides for the upper and lower edges of said doors.

8. The combination of inner and outer doors adapted to control the discharge of a car opening, means for causing the lower edges of said doors to move in a horizontal plane, said means including a shaft for actuating said inner doors and guides for the upper and lower edges of said doors.

9. The combination with a car body having a discharge opening formed therein, of a suspension frame below said opening, movable doors supported by said frame and forming the bottom thereof, tracks for guiding the lower edges of said doors, said tracks having depressions formed therein for accelerating and retarding the movement of said doors, and means for guiding the upper edges of said doors at right angles to said tracks.

10. In a door operating mechanism, the combination of inner and outer doors, tracks movably supporting the lower edges of said doors with said outer doors at right angles to said inner doors, means for guiding the upper edges of said doors, means for coupling the lower edges of said inner doors to said outer doors, means for moving said inner doors, and means to lock said inner doors in a closed position.

11. In a door operating mechanism, the combination of inner and outer movable doors, tracks movably supporting the lower edges of said doors with said outer doors at right angles to said inner doors, means for guiding the upper edges of said doors, means for coupling the lower edges of said inner doors to said outer doors, and means for moving said inner doors.

12. In a door operating mechanism, the combination of inner and outer movable doors, tracks movably supporting the lower edges of said doors with said outer doors at right angles to said inner doors, means for guiding the upper edges of said doors, and means for locking said doors in a closed position.

13. The combination with a car body, of doors for controlling the discharge of dumpable material from said body, means for supporting said doors at an inclination relative to one another when in a closed position, means for primarily moving said doors to an inclination more acute than the inclination of the doors when the latter are in the closed position to partially open the doors and permit the discharge of a portion of the material bearing against the doors, said doors in the latter position assuming an angle such as to cause the weight of the load against the doors to force the latter to full open position, the lower edges of said doors in the opening and closing movement thereof traveling in substantially a horizontal plane and the upper edges of said doors during such movement traveling in planes substantially at right angles to the plane traveled by the lower edges of the doors.

14. In a dump car, a car body, and doors forming the bottom of said car body, said doors being arranged in pairs connected together and operable in unison, the doors of each pair when in closed position disposed at such an angle with respect to the walls of the car body as to cause the contents of the car body to be directed against the doors in such manner as to tend to force the latter to closed position, means connected to the doors for primarily moving the same to render the angle of the doors more acute with respect to the car body and thereby position the doors so that the weight of the car contents is directed against the doors to force them to completely open position, the lower edges of said doors during the opening and closing movement of the doors traveling in substantially a horizontal plane and the upper edges of the doors during such opening and closing movement traveling in planes substantially at right angles to the plane traveled by the lower edges of the doors.

15. In a dump car, a car body, and doors forming the bottom of said car body, said doors disposed at such an angle with respect to the walls of the car body when in the closed position that the weight of the car body contents is directed against the doors in a direction tending to force the doors toward closed position, means for primarily moving the doors to shift the same to partially open position and at an angle with respect to the car body walls more acute than that occupied by the doors when in the closed position whereby the weight of the contents of the car body is then directed against the doors in a direction to force the latter to full open position as the contents of the car discharges, said doors automatically closing by gravity when the contents of the car body have been discharged, the lower edges of said doors in the opening and closing movement thereof traveling in substantially a horizontal plane throughout their movement and the upper edges of the doors during such opening and closing movement traveling in planes substantially at right angles to the plane traveled by the lower edges of the doors.

16. In a dump car, a car body, and doors forming the bottom of said car body, said doors disposed at such an angle with respect to the walls of the car body when in the closed position that the weight of the car body contents is directed against the doors in a direction tending to force the doors toward closed position, means for primarily moving the doors to shift the same to partially open position and at an angle with respect to the car body walls more acute than that occupied by the doors when in the closed position whereby the weight of the contents of the car body is then directed against the doors in a direction to force the latter to full open position as the contents of the car discharges, means for accelerating the primary or initial movement of said doors and for retarding the final opening movement thereof and for accelerating the initial closing movement of the doors, said doors automatically closing by gravity when the contents of the car body have been discharged, the lower edges of said doors in the opening and closing movement thereof traveling in substantially a horizontal plane throughout their movement and the upper edges of the doors during such opening and closing movement traveling in planes substantially at right angles to the plane traveled by the lower edges of the doors.

17. In a dump car, a car body, and a plurality of swinging doors forming the bottom of said car, said doors being arranged in pairs linked together whereby the doors operate in unison both in the opening and closing movement thereof, said doors in their closed position disposed at a right angle with respect to the walls of the car body, means for manually operating the doors to impart initial opening movement thereto and shift the doors to an inclination more acute with respect to the walls of the car body whereby the weight of the car contents is delivered against the doors in a direction which will tend to force the doors to completely open position automatically, said doors having a tendency to automatically return to closed position by gravity when the contents of the car body is discharged, the lower edges of said doors during the opening and closing movement thereof traveling in substantially a horizontal plane and the upper edges of the doors during such opening and closing movement traveling in planes substantially at right angles to the plane traveled by the lower edges of the doors.

18. The combination with a car body, having a discharge opening, and shiftable gravity closing doors constituting the bottom of said car body for controlling the discharge of material therefrom, the lower edges of said doors movable in a horizontal plane in their opening and closing movement and the upper edges of the doors movable in planes at right angles to the plane of movement of the lower edges, manually-operable means carried by said car for actuating the doors to impart initial opening movement thereto, and means for locking said doors in a closed position.

19. In combination with a car body having a bottom discharge opening, a bottom for said discharge opening, said bottom comprising a plurality of door sections so disposed as to have a normal tendency to move to closed position, said sections connected together to move in unison, each of said sections in the opening and closing movement thereof having its lower edge traveling in a horizontal plane and its upper edge traveling in a plane at right angles to the plane traveled by the lower edge.

20. A closure for the discharge opening of a car or like body, comprising a plurality of angularly-disposed sections each so disposed as to have a tendency to normally move to closed position, each section so disposed that in the opening and closing movement thereof the lower edge of the section travels in a plane at right angles to the plane traveled by the upper edge of each section during such opening and closing movement, and means disposed beneath said sections with which the free edges thereof engage during the opening and closing movement of the sections.

21. The combination of a car body having a discharge opening, and a plurality of angularly-disposed doors controlling the discharge of material through said opening, toggle arms pivotally-connected to said doors and to each other and locking the doors in closed position, means connected to said toggle arms for actuating the same to permit opening movement of the doors, said toggle arms acting to automatically lock the doors in closed position upon their return thereto, the lower edges of said doors in the opening and closing movement thereof traveling in planes at right angles to the upper edges of the doors during such opening and closing movement of the doors, and means disposed to be engaged by the free edges of said doors during their opening and closing movement.

22. A door for closing a receptacle, comprising a plurality of angularly-disposed sections adapted when released to be automatically shifted toward the perpendicular by pressure and automatically-shiftable from the perpendicular to closed position when pressure is relieved from the doors, the lower edges of said doors traveling in a horizontal plane during their opening and closing movement and the upper edges of the doors traveling in planes at right angles thereto.

23. A car door shiftable to open position by load pressure and automatically-movable to closed position when relieved of load pressure, means for accentuating the opening and closing movement of the door, the lower edge of the door during its opening and closing movement traveling in a horizontal plane and the upper edge of said door during such movement traveling in a plane at right angles to the plane traveled by the lower edge.

24. A car door shiftable to open position by load pressure and automatically-movable to closed position when relieved of load pressure, the lower edge of the door during its opening and closing movement traveling in substantially a horizontal plane and the upper edge of the door traveling in a plane at right angles thereto, and means disposed to support said door in both the open and closed positions and with which the door engages during its opening and closing movement.

25. In a dump car, a car body, and a plurality of doors forming the bottom of said body, said doors arranged in pairs and shiftable laterally of the car body to open and closed positions, and means connecting alternate doors of the pairs of doors together.

26. A closure for the discharge opening of a car or like body, comprising a plurality of doors arranged in pairs and shiftable laterally of the car or body to open and closed positions, and tie rods connecting alternate doors of the pairs of doors together.

27. In a dump car, a car body having a discharge opening, doors for said opening constituting the bottom of said car body, said doors being arranged in pairs and shiftable laterally of the car body to open and closed positions, tie rods connecting alternate doors of the pairs of doors together, and toggle links carried by one pair of doors for locking all of the doors in closed position.

28. In a dump car, a car body having a discharge opening, doors for said opening constituting the bottom of said car body, said doors arranged in inner and outer pairs and shiftable laterally of the car body to open and closed positions, actuating means connected to the inner pairs of doors, means connecting alternate doors of the pairs whereby all of the doors move in unison, and automatically-operating locking means for securing the doors in closed position.

29. In a dump car, a car body having a discharge opening, doors for said opening constituting the bottom of said car body, said doors arranged in pairs shiftable laterally of the car body to open and closed positions, actuating means connected to one of said pairs of doors, means connecting alternate doors of the pairs together whereby all of the doors move in unison, locking means for securing said doors in closed position, and connections between said locking means and said actuating means whereby the locking means is released when the door actuating means is operated.

30. In a dump car, a car body having a discharge opening, a plurality of doors for said opening constituting the bottom of said car body and arranged in pairs shiftable laterally of the car body to open and closed positions, tie rods connecting alternate doors of the pairs together whereby all of the doors are caused to move in unison to open and closed positions, actuating means for said doors, toggle-links for locking the doors in closed position, and connections between said toggle-links and the door-actuating mechanism whereby the locking means is released automatically with the operation of the door-actuating means.

31. A closure for the discharge opening of a car or like receptacle, comprising a plurality of angularly-disposed doors each so disposed as to have a tendency to normally move to closed position by gravity, said doors arranged in pairs actuating means for said doors, and tie rods connecting alternate doors of the pairs together whereby all of the doors are caused to move in unison in their opening and closing movements.

32. Means for closing the discharge opening of receptacles, comprising a plurality of doors each so disposed as to have a normal tendency to move to closed position by gravity said doors arranged in pairs actuating means for said doors, means connecting alternate doors of the pairs together whereby all of the doors are caused to move in unison, when actuated, locking means for securing the doors in closed position, and means whereby when the actuating means is operated the door-locking means is automatically released.

33. In a dump car, a car body having a discharge opening, and angularly-disposed doors for said opening constituting the bottom of said car body, said doors arranged in pairs and shiftable laterally of the car body to open and closed positions, said doors pivotally-mounted so as to permit the elevating of the upper edge as the door moves laterally of one car body to open position with the lower edge traveling in substantially a horizontal plane, and means tying alternate doors of the pairs of doors together to effect uniformity of travel in the opening and closing movements of all of the doors.

In testimony whereof I affix my signature in the presence of two witnesses.

PATRICK J. HARRIGAN.

Witnesses:
R. M. PARKER,
A. M. WILSON.